3,179,523
METHODS OF MAKING FOUNDRY CORES AND MOULDS

Rolf Erhard Morén, Alfredshem, Sweden, assignor to Mo Och Domsjö Aktiebolag, Ornskoldsvik, Sweden, a corporation of Sweden
No Drawing. Filed Nov. 15, 1961, Ser. No. 152,665
Claims priority, application Great Britain, Nov. 21, 1960, 40,003/60
2 Claims. (Cl. 106—38.35)

This invention relates to the production of sand cores and moulds for foundry purposes.

According to the invention said cores and moulds are formed with the aid of a binder for the sand comprising a magnesium or zinc oxysalt cement and an organic binder. Sand cores and moulds thus formed and their use in casting are also included within the scope of the invention.

The cement may be magnesium oxychloride cement. Magnesium oxide may be mixed with magnesium chloride and a suitable amount of water added, whereupon the mixture hardens due to the formation of magnesium oxychloride. A mixture of zinc oxide and zinc chloride hardens in a similar manner by forming zinc oxychloride and can also be used. Salts other than the chlorides, such as sulphates, phosphates, silicates and nitrates, can also be used. It is also possible to use the magnesium or zinc oxide together with a calcium salt, such as calcium carbonate.

The cement compounds may be added to the sand used for forming cores and moulds in amounts of 1 to 15%, based on the weight of the sand, preferably 2 to 8%, together with the necessary amount of water, generally 1 to 10% by weight, based on the sand. The cores and moulds formed from the mixture may be allowed to self-harden by the reaction explained above. Hardening may take place in air at room temperature, but may also be carried out at a higher temperature by baking in an oven. It is also possible, however, to accelerate the hardening by passing carbon dioxide through the core or mould, whereby part of the cement reacts to form magnesium or zinc carbonate. In the latter case the core or mould advantageously contains an organic base or salt thereof, e.g. triethanolamine, as an accelerator.

Whether or not carbon dioxide is used in the hardening, a very hard and strong core or mould is obtained, which, however, collapses readily after the casting is finished and thus easily removed from the castings.

As above mentioned, the binder also comprises an organic binder in an amount of 0.2 to 10% by weight, based on the sand. The organic binder, which serves to increase the green strength of the core, to provide better plasticity in the sand mix, to improve the collapsibility and to a certain extent to control the setting time, may be a water-soluble cellulose derivative, such as ethylcellulose, methylcellulose, hydroxyethylcellulose, ethylhydroxyethylcellulose or carboxymethylcellulose, or another water-soluble polysaccharide or polysaccharide derivative, such as starch, alginic acid or dextrin, sugar, molasses, sulphite waste liquor, a thermosetting or thermoplastic resin, such as a phenolic resin, a melamine resin, a urea formaldehyde resin, a furfural resin, a polyvinyl resin, an acrylic resin, or an oil binder.

The binder may also comprise other inorganic additives or binders, such as plaster of Paris, Portland cement, lime, water-glass or a clay.

Wetting agents may also be included in the mix to improve the distribution of the water.

The invention is illustrated by the following examples. In all these examples, the percentages indicated are based on the weight of the sand. The sand used in the examples was a pure silica sand having an average grain size of about 0.27 mm.

In the examples, the various ingredients listed were added to the sand and the resulting sand mix was mixed well, whereupon standard test cores were prepared and tested for green compressive strength (compressive strength immediately after preparation of the test core) and for compressive strength after hardening.

Example I

Standard formulation:
  Magnesium oxide (MgO): 4%
  Magnesium Chloride ($MgCl_2$, $7H_2O$): 3%
  Additive according to the following table: 0.5%
  Water: 3%
  The compressive strength is obtained after storing in air at a temp. of 20° C.

| Additive | Green strength compressive strength, g./mm.², after standing, hours | | | | | | | |
|---|---|---|---|---|---|---|---|---|
| | G./mm.² | 4 | 8 | 12 | 16 | 20 | 24 | 48 |
| Ethyl-hydroxyethylcellulose, medium viscosity | 1.22 | 23 | 48 | 92 | 185 | 224 | 316 | 327 |
| Starch | 0.62 | 19 | 46 | 75 | 163 | 236 | 305 | >360 |
| Dextrin | 0.54 | 20 | 40 | 90 | 167 | 214 | 252 | >360 |
| Melamine resin | 0.61 | 22 | 43 | 83 | 150 | 165 | 200 | 265 |
| Urea formaldehyde resin, 100% | 0.58 | 19 | 40 | 81 | 149 | 166 | 214 | 296 |
| Hydroxyethylcellulose, high viscosity | 1.08 | 18 | 57 | 124 | 225 | 333 | >360 | >360 |
| Carboxymethylcellulose, medium viscosity | 1.26 | 22 | 43 | 60 | 97 | 127 | 138 | 169 |
| Dextrose | 0.68 | 21 | 44 | 84 | 144 | 190 | 235 | >360 |
| Beet sugar | 0.70 | 19 | 50 | 96 | 150 | 191 | 223 | 351 |
| No additive | 0.55 | 21 | 48 | 85 | 168 | 207 | 205 | 246 |

Example II

Standard formulation:
- Magnesium oxide (MgO): 2%
- Magnesium chloride (MgCl$_2$, 7H$_2$O): 2%
- Water: 3%
- Additive: Ethyl-hydroxyethylcellulose (EHEC) or hydroxyethyl cellulose (HEC)

| Additive | Green strength, g./mm.$^2$ | Shatter index, percent | Compressive strength, g./mm.$^2$ | | | | | | | | | |
|---|---|---|---|---|---|---|---|---|---|---|---|---|
| | | | Kept in air at 20° C., hours | | | | | | Kept air-tight at 20° C., hours | | | |
| | | | 4 | 8 | 12 | 16 | 20 | 24 | 48 | 8 | 16 | 24 | 48 |
| EHEC 0.2% | 0.43 | 31 | 0 | 18 | 30 | 54 | 77 | 92 | 146 | 16 | 53 | 79 | 104 |
| | 0.73 | 69 | 15 | 27 | 43 | 83 | 108 | 147 | 250 | 30 | 66 | 98 | 117 |
| HEC 0.2 | 0.50 | 54 | 14 | 27 | 48 | 84 | 120 | 190 | 274 | 27 | 63 | 88 | 100 |

Example III

Standard formulation:
- Magnesium oxide (MgO): 3%
- Magnesium chloride (MgCl$_2$, 7H$_2$O): 3%
- Water: 3%
- Additive: Ethyl-hydroxyethylcellulose (EHEC) or hydroxyethyl cellulose (HEC)

| Additive | Green strength, g./mm.$^2$ | Shatter index, percent | Compressive strength, g./mm.$^2$ | | | | | | | | | |
|---|---|---|---|---|---|---|---|---|---|---|---|---|
| | | | Kept in air at 20° C., hours | | | | | | Kept air-tight at 20° C., hours | | | |
| | | | 4 | 8 | 12 | 16 | 20 | 24 | 48 | 8 | 16 | 24 | 48 |
| EHEC 0.2% | 0.43 | 40 | 16 | 28 | 82 | 111 | 155 | 193 | 225 | 32 | 104 | 145 | 157 |
| | 0.75 | 75 | 17 | 36 | 79 | 133 | 193 | 244 | 323 | 39 | 122 | 180 | 201 |
| HEC 0.2% | 0.54 | 59 | 16 | 34 | 67 | 120 | 191 | 227 | 330 | 36 | 128 | 182 | 206 |

Example IV

Standard formulation:
- Magnesium oxide (MgO): 4%
- Magnesium sulphate (MgSO$_4$, 3H$_2$O): 3.4%
- Water: 5%
- Kerosene: 0.2%
- Additive: Hydroxyethylcellulose (HEC)

| Additive | Green strength, g./mm.$^2$ | Shatter index, percent | Compressive strength, g./mm.$^2$ | | | | | | | |
|---|---|---|---|---|---|---|---|---|---|---|
| | | | Kept in air at 20° C., hours | | | | Kept air-tight at 20° C., hours | | | |
| | | | 4 | 8 | 16 | 24 | 4 | 8 | 16 | 24 |
| HEC 0.2% | 0.60 | 44 | 36 | 67 | 132 | 173 | 25 | 31 | 78 | 103 |
| | 0.70 | 41 | 51 | 104 | 145 | 217 | 22 | 36 | 88 | 153 |
| HEC 0.4% | 0.78 | 38 | 46 | 80 | 169 | 262 | 22 | 37 | 104 | 177 |

Example V

Standard formulation:
- Magnesium oxide (MgO): 3%
- Magnesium sulphate (MgSO$_4$, 3H$_2$O): 1.2%
- Magnesium chloride (MgCl$_2$, 7H$_2$O): 1.5%
- Hydroxyethylcellulose (HEC), high viscosity: 0.4%
- Kerosene: 0.2%
- Water: 3, 4, 5 and 6% resp.
- Baking time: 1 hour at 160° C.

| Water addition, percent | Green compressive strength, g./mm.$^2$ | Baked compressive strength, g./mm.$^2$ |
|---|---|---|
| 3.0 | 0.90 | 281 |
| 4.0 | 0.78 | 293 |
| 5.0 | 0.81 | 344 |
| 6.0 | 0.79 | >360 |

Example VI

Standard formulation:
- Magnesium oxide (MgO): 2.5, 3.0, 3.5, 4.0 and 4.5% resp.
- Magnesium sulphate (MgSO$_4$, 3H$_2$O): 1.2%
- Magnesium chloride (MgCl$_2$, 7H$_2$O): 1.5%
- Hydroxyethylcellulose (HEC), high viscosity: 0.4%
- Kerosene: 0.2%
- Water: 4%
- Baking time: 1 hour at 160° C.

| MgO | Green compressive strength, g./mm.$^2$ | Baked compressive strength, g./mm.$^2$ |
|---|---|---|
| 2.5 | 0.81 | 255 |
| 3.0 | 0.86 | 266 |
| 3.5 | 0.98 | 322 |
| 4.0 | 0.97 | 350 |
| 4.5 | 0.97 | 279 |

Example VII

Standard formulation:
- Magnesium oxide (MgO): 4%
- Magnesium sulphate (MgSO$_4$, 3H$_2$O): 1.2%
- Magnesium chloride (MgCl$_2$, 7H$_2$O): 1.5%
- Kerosene: 0.2%
- Water: 4%
- Additive: Hydroxyethylcellulose (HEC): 0, 0.2, 0.4 and 0.6% resp.

| HEC, percent | Green compressive strength, g./mm.$^2$ | Compressive strength after exposing 24 hrs. in air at 20° C., g./mm.$^2$ |
|---|---|---|
| 0 | 0.63 | 190 |
| 0.2 | 0.72 | >360 |
| 0.4 | 0.97 | 350 |
| 0.6 | 1.08 | 333 |

Example VIII

Standard formulation:
- Magnesium oxide (MgO): 4%
- Magnesium phosphate (MgHPO$_4$, 3H$_2$O): 2%
- Kerosene: 0.2%
- Water: 5%
- Additive: 0.5% ethyl-hydroxyethylcellulose (EHEC), 0.5% hydroxyethylcellulose (HEC) resp.

| Additive | Green compressive strength, g./mm.$^2$ | Compressive strength, g./mm.$^2$ after exposing in air at 20° C. | |
|---|---|---|---|
| | | 2 hrs. | 24 hrs. |
| EHEC | 1.22 | 20 | 134 |
| HEC | 1.13 | 19 | 104 |
| | 0.68 | 15 | 15 |

Example IX

Formulation:
- Magnesium oxide (MgO): 4%
- Calcium carbonate ($CaCO_3$): 2%
- Ethyl-hydroxyethylcellulose: 0.6%
- Water: 4%

Green compressive strength, g./mm.$^2$ _____ 1.5
Compressive strength, g./mm.$^2$ after exposing in air at 20° C.:
- 4 hrs. _____ 47
- 8 hrs. _____ 98
- 12 hrs. _____ 125
- 16 hrs. _____ 146
- 20 hrs. _____ 184
- 24 hrs. _____ 200

Example X

Formulation:
- Magnesium oxide (MgO): 4%
- Calcium carbonate ($CaCO_3$): 2%
- Ethyl-hydroxyethylcellulose: 0.4%
- Melamine resin: 0.4%
- Water: 4%

Green compressive strength, g./mm.$^2$ _____ 1.31
Compressive strength, g./mm.$^2$, after exposing in air at 20° C.:
- 4 hrs. _____ 28
- 8 hrs. _____ 56
- 12 hrs. _____ 115
- 16 hrs. _____ 144
- 20 hrs. _____ 147
- 24 hrs. _____ 163

Example XI

Formulation:
- Magnesium oxide (MgO): 4%
- Calcium carbonate (CaO): 2%
- Magnesium sulphate ($MgSO_1 \cdot 3H_2O$): 0.5%
- Hydroxyethylcellulose: 0.6%
- Water: 4%

Green compressive strength, g./mm.$^2$ _____ 1.39
Compressive strength, g./mm.$^2$, after exposing in air at 20° C.:
- 4 hrs. _____ 34
- 8 hrs. _____ 49
- 12 hrs. _____ 89
- 16 hrs. _____ 122
- 20 hrs. _____ 135
- 24 hrs. _____ 166

Example XII

Formulation:
- Magnesium oxide (MgO): 3%
- Magnesium chloride ($MgCl_2 \cdot 7H_2O$): 1.5%
- Calcium carbonate ($CaCO_3$): 2%
- Ethyl-hydroxyethylcellulose: 0.4%
- Water: 4%

Green compressive strength, g./mm.$^2$ _____ 2.28
Compressive strength, g./mm.$^2$, after exposing in air at 20° C.:
- 4 hrs. _____ 100
- 8 hrs. _____ 105
- 12 hrs. _____ 154
- 16 hrs. _____ 198
- 20 hrs. _____ 230
- 24 hrs. _____ 262

Example XIII

Formulation:
- Magnesium oxide (MgO): 3%
- Calcium carbonate ($CaCO_3$): 2%
- Magnesium sulphate ($MgSO_4 \cdot 3H_2O$): 1.2%
- Magnesium chloride ($MgCl_2 \cdot 7H_2O$): 1.0%
- Hydroxyethylcellulose: 0.4%
- Water: 4%

Green compressive strength, g./mm.$^2$ _____ 1.55
Compressive strength, g./mm.$^2$, after exposing in air at 20° C.:
- 8 hrs. _____ 121
- 12 hrs. _____ 241
- 16 hrs. _____ 360
- 20 hrs. _____ 360
- 24 hrs. _____ 360

Compressive strength, g./mm.$^2$, after toring in the absence of air at 20° C.:
- 8 hrs. _____ 70
- 16 hrs. _____ 176
- 24 hrs. _____ 227

Compressive strength, g./mm.$^2$, after baking at 160° C. for ½ hr. _____ 360

Example XIV

A core or mould prepared by the use of a formulation as in Example I is coated after hardening with a composition comprising 500 mls. of water, 50 g. of magnesium chloride, 50 g. of magnesium oxide and 100 g. of graphite. Thereby, the core or mould obtains a very hard and smooth surface.

Example XV

A composition comprising 50 g. of magnesium chloride, and 100 g. of graphite in 500 mls. of water is used to treat cores or moulds prepared as in Example I. A hard smooth surface is obtained.

Example XVI

Cores and moulds prepared as in Example I are surface-coated with a composition comprising 500 mls. of water, 50 g. of magnesium chloride, 50 g. of magnesium oxide, 100 g. of graphite and 2 g. of ethyl-hydroxyethylcellulose to render the surface hard.

Example XVII

A composition comprising 500 mls. of ethanol (96%), 50 g. of mangesium chloride, 50 g. of mangnesium oxide and 100 g. of graphite is suitable for coating cores and moulds to make the surface harder.

I claim:
1. A method of making foundard sand mold members, which comprises (1) preparing a mixture consisting essentially of sand an cement-forming components selected from the group consisting of zinc oxysalt cement-forming compounds and magnesium oxysalt cement-forming compounds in an amount of 1 to 15%, based on the weight of the sand (2) water in an amount of 1 to 10%, based on the weight of the sand and (3) an organic binder selected from the group consisting of water-soluble polysaccharides and water-soluble polysaccharide derivatives in an amountof 0.2 to 10%, based on the weight of the sand, forming mold members from the resulting mixture and hardening said mold members.

2. A method as in claim 1, in which said organic binder is selected from the group consisting of hydroxyethylcellulose and ethyl-hydroxyethylcellulose.

References Cited by the Examiner

UNITED STATES PATENTS

| | | | |
|---|---|---|---|
| 1,962,764 | 6/34 | Coleman | 106—38.3 |
| 2,243,094 | 5/41 | Grossman | 106—38.3 |
| 2,869,194 | 1/59 | Cooper | 22—193 |
| 2,913,787 | 11/59 | Cooper | 22—193 |
| 2,987,789 | 6/61 | Moren | 22—193 |

FOREIGN PATENTS 834,876  5/60  Great Britain.

MICHAEL V. BRINDISI, *Primary Examiner.*

MARCUS U. LYONS, *Examiner.*